US012698660B2

(12) United States Patent
Gstrein

(10) Patent No.: US 12,698,660 B2
(45) Date of Patent: Aug. 4, 2026

(54) FURNITURE FITTING AND METHOD FOR FASTENING A FURNITURE FITTING

(71) Applicant: Julius Blum GmbH, Hoechst (AT)

(72) Inventor: Florian Gstrein, Wolfurt (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/501,532

(22) Filed: Nov. 3, 2023

(65) Prior Publication Data

US 2024/0151082 A1 May 9, 2024

Related U.S. Application Data

(63) Continuation of application No. PCT/AT2022/060103, filed on Apr. 5, 2022.

(30) Foreign Application Priority Data

May 4, 2021 (AT) .................................. 50100/2021

(51) Int. Cl.
*E05D 5/00* (2006.01)
*E05D 5/06* (2006.01)
*E05D 5/08* (2006.01)

(52) U.S. Cl.
CPC ............... *E05D 5/065* (2013.01); *E05D 5/08* (2013.01); *E05Y 2600/51* (2013.01); (Continued)

(58) Field of Classification Search
CPC ........... E05Y 2900/20; E05Y 2900/202; E05Y 2900/204; E05Y 2900/208; E05Y 2201/20; E05Y 2201/21; E05Y 2201/261; E05Y 2600/51; E05Y 2600/632; E05Y 2201/11; E05Y 2201/258; E05Y 2201/46; E05Y 2201/474; E05F 5/006; E05F 5/065;
(Continued)

(56) References Cited

U.S. PATENT DOCUMENTS 3,197,806 A 8/1965 Ennis
4,085,481 A 4/1978 Lautenschläger
(Continued)

FOREIGN PATENT DOCUMENTS

AT 008 773 12/2006
CN 205000799 U * 1/2016
(Continued)

OTHER PUBLICATIONS

International Search Report issued Jun. 28, 2022 in International (PCT) Application No. PCT/AT2022/060103.

*Primary Examiner* — Chuck Y Mah
(74) *Attorney, Agent, or Firm* — Wenderoth, Lind & Ponack, L.L.P.

(57) ABSTRACT

A furniture fitting for movably mounting a furniture part on a furniture carcass includes a mounting body to be fastened to the furniture part or to the furniture carcass by a fastening screw. The mounting body is formed, at least in certain regions, from a first material, preferably a metallic material such as steel. The mounting body has a receiving element in which the fastening screw is or can be mounted, and the receiving element is formed at least partially from a second material, preferably plastic, which second material is different from the first material.

22 Claims, 9 Drawing Sheets

(52) U.S. Cl.
CPC ... *E05Y 2600/632* (2013.01); *E05Y 2800/676* (2013.01); *E05Y 2900/20* (2013.01)

(58) Field of Classification Search
CPC .... E05F 5/02; E05F 5/027; E05F 5/10; E05D 11/0054; E05D 11/1021; E05D 11/1042; E05D 11/105; E05D 11/1064; E05D 7/04; E05D 7/0407; E05D 7/0415; E05D 7/0423; E05D 7/1083; E05D 7/12; E05D 7/123; E05D 7/125; E05D 3/142; E05D 3/02; E05D 5/065; E05D 5/08; E05D 2007/0492; E05D 2007/128; E05D 2207/0476; E05D 2207/0484; E05D 2207/1094; F16B 41/002
See application file for complete search history.

(56) References Cited

U.S. PATENT DOCUMENTS

| | | | | | |
|---|---|---|---|---|---|
| 4,862,556 | A | | 9/1989 | Grass | |
| 4,982,476 | A | | 1/1991 | Salice | |
| 5,105,506 | A | * | 4/1992 | Lin | E05D 7/0407 16/DIG. 43 |
| 5,561,888 | A | | 10/1996 | Lautenschläger | |
| 5,662,444 | A | * | 9/1997 | Schmidt, Jr. | F16B 41/002 411/533 |
| 5,966,779 | A | | 10/1999 | Salice | |
| 6,266,848 | B1 | * | 7/2001 | Fraccaro | E05D 7/0407 16/241 |
| 6,336,253 | B1 | * | 1/2002 | Salice | E05D 5/0276 16/382 |
| 6,602,027 | B2 | | 8/2003 | Deaton et al. | |
| 6,807,713 | B2 | | 10/2004 | Röck | |
| 6,814,530 | B2 | * | 11/2004 | Franco | F16B 5/0208 411/970 |
| 8,904,599 | B2 | * | 12/2014 | Migli | E05D 5/065 16/382 |
| 9,328,545 | B1 | * | 5/2016 | Ng | E05D 7/0415 |
| 9,874,049 | B1 | * | 1/2018 | McGregor | E05D 5/065 |
| 10,246,917 | B2 | * | 4/2019 | Ginter | E05D 3/08 |
| 2002/0138944 | A1 | | 10/2002 | Schnelle et al. | |
| 2004/0107542 | A1 | | 6/2004 | Rock | |
| 2005/0129488 | A1 | * | 6/2005 | Weinstein | F16B 43/00 411/533 |
| 2010/0175500 | A1 | * | 7/2010 | Lin | G06F 1/1686 74/567 |
| 2011/0291538 | A1 | | 12/2011 | Brunnmayr | |
| 2013/0167323 | A1 | * | 7/2013 | Brunnmayr | E05D 7/0415 16/50 |
| 2015/0337577 | A1 | * | 11/2015 | Peer | E05D 3/02 16/237 |
| 2017/0370139 | A1 | * | 12/2017 | McGregor | E05D 11/10 |
| 2019/0211597 | A1 | * | 7/2019 | Tanriverdi | E05F 5/006 |
| 2020/0063777 | A1 | * | 2/2020 | Hagspiel | F16B 12/24 |
| 2021/0115714 | A1 | | 4/2021 | Duer | |

FOREIGN PATENT DOCUMENTS

| | | | | | |
|---|---|---|---|---|---|
| CN | 105909098 | A | * | 8/2016 | |
| CN | 112368456 | | | 2/2021 | |
| DE | 37 17 376 | | | 12/1988 | |
| DE | 38 41 933 | | | 6/1990 | |
| DE | 3841933 | A1 | * | 6/1990 | E05D 7/0407 |
| DE | 43 43 805 | | | 6/1995 | |
| EP | 1 247 929 | A2 | | 10/2002 | |
| EP | 1 247 929 | A3 | | 11/2005 | |
| JP | 52-105070 | | | 9/1977 | |
| JP | 2000-314263 | | | 11/2000 | |

* cited by examiner

FURNITURE FITTING AND METHOD FOR FASTENING A FURNITURE FITTING

BACKGROUND OF THE INVENTION

The present invention relates to a furniture fitting, in particular a furniture hinge, a piece of furniture with such a furniture fitting as well as a method for fastening a furniture fitting.

Corresponding furniture fittings, in particular furniture hinges, are formed to mount a furniture part movable on a furniture carcass. Such furniture fittings comprise at least one installing body which is to be fastened on the furniture part or furniture carcass via at least one fastening screw.

The installing body of the furniture fitting is usually made of a metallic material, for example steel, wherein the fastening screw can be screwed into the furniture carcass or furniture part via a drilled hole or opening in the installing body and then retains the installing body on the furniture carcass or the furniture part.

It is further known, in order to facilitate the fastening of the furniture fitting on the furniture part or furniture carcass, to pre-install the fastening screw on the installing body in advance, as is shown for example by AT 008773 U1. Thus a drilled hole, which corresponds to an external diameter of the thread of a fastening screw (the drilled hole is usually produced with a somewhat smaller diameter than the external diameter of the thread), is prefabricated in the installing body, wherein the fastening screw is then driven into the drilled hole until the first thread turns engage with the drilled hole of the installing body.

Once the first thread turns engage with the installing body, the fastening screw is pre-installed and only a small part (the tip) of the fastening screw protrudes from a contact surface at which the furniture fitting can be attached to the furniture part and/or furniture carcass.

If the user now attaches the furniture fitting to the furniture part or furniture carcass at the preset position, with a small application of force the tip of the fastening screw (which protrudes from the contact surface) is pushed into the surface of the furniture part or furniture carcass or inserted into a prefabricated drilled hole on the furniture part or furniture carcass, wherein the operator can then screw in the fastening screw (for fastening).

This results in the substantial advantage that, when attaching the furniture fitting to the furniture part or furniture carcass, an operator only needs to hold the furniture fitting and can screw in the pre-installed screw directly. Thus the operator no longer needs to introduce (or insert) the fastening screw separately (using another free hand) into an opening of the furniture fitting while they position the furniture fitting on the furniture part or furniture carcass.

However, a disadvantage here is that, for pre-installation, the fastening screw must be driven into the drilled hole or opening of the installing body far enough for it to engage with its full circumference, wherein a part of the fastening screw (the tip of the screw) already projects from the contact surface.

A further disadvantage is that the circumference of the fastening screw engages with or rubs against the hard, metallic installing body in the drilled hole or opening, whereby the thread tip of the fastening screw can be damaged before use and no longer be used with its full "sharpness" in the furniture part or furniture carcass.

SUMMARY OF THE INVENTION

The object of the present invention is to provide a furniture fitting and a method for fastening a furniture fitting in which the previously mentioned disadvantages of the state of the art are at least partly improved and/or a better handling of the furniture fitting, preferably during a fastening, is achieved.

It is provided according to the invention that a furniture fitting, in particular a furniture hinge, for the movable mounting of a furniture part on a furniture carcass comprises at least one installing body, which is to be fastened on the furniture part or furniture carcass via at least one fastening screw, wherein the installing body is formed of a first material, preferably a metallic material, particularly preferably a steel, at least in areas, wherein the installing body has at least one receiving element in which the at least one fastening screw is or can be mounted, wherein the at least one receiving element is formed at least predominantly of a second material, preferably plastic, that is different from the first material.

Thus the installing body of the furniture fitting can serve to fasten the furniture fitting on a furniture part or furniture carcass with the help of a receiving element with the at least one fastening screw, wherein the fastening screw engages on a material on the installing body which differs from that of the rest of the installing body.

Thus for example a soft, elastic, easily deformable material can be chosen for the receiving element, wherein the fastening screw can drill through the receiving element, wherein no damage to the fastening screw occurs (if the receiving element is made of a plastic, for example).

Thus the fastening screw can already be retained by the receiving element, even after only a tip of the fastening screw has penetrated, because it is no longer absolutely essential to match an opening or drilled hole to a circumference of the fastening screw, because the fastening screw can pierce or displace the receiving element.

By way of example, if a rubbery-elastic material is used for the at least one receiving element, in theory the provision of an opening in the receiving element is not actually necessary, because the fastening screw can itself drill through the rubbery-elastic material after insertion and thus an opening for the at least one fastening screw is formed by screwing the fastening screw into the at least one receiving element, wherein the rubbery-elastic material always provides a foothold for the at least one fastening screw because the rubbery-elastic material adapts to an external diameter and/or geometry of the at least one fastening screw.

A furniture fitting according to the invention or a method according to the invention can also be used and subsequently installed in embodiments already known in the state of the art, as mentioned for example in the introduction to the description.

It can be provided that the installing body has at least one contact surface which can be attached to the furniture part or furniture carcass at least in areas in the course of the fastening, wherein in an unfastened state of the installing body the at least one fastening screw is arranged at least predominantly on a side facing away from the contact surface and can be moved at least in sections through an opening in the contact surface in the course of the fastening.

It is preferably provided that the at least one receiving element has at least one substantially radial indentation.

The installing body can have at least one contact surface which can be attached to the furniture part or furniture carcass at least in areas in the course of the fastening, wherein for example the at least one indentation is arranged on a side of the at least one receiving element facing away from the contact surface.

This substantially radial indentation can be provided to crush chips forming around a screwing-in of the at least one fastening screw, which form from the second material (of which the at least one receiving element is made). Such a crushing of the chips avoids the risk of flow chips forming, which could hinder or disrupt the installation or fastening of the furniture fitting on a furniture part or furniture carcass. Crushing the chips means that only smaller chips—so-called chip fragments or discontinuous chips—are generated which can be easily removed from the installation point.

It can be provided that the at least one receiving element and/or the installing body has at least one recess, the installing body preferably has at least one contact surface which can be attached to the furniture part or furniture carcass at least in areas in the course of the fastening, wherein for example the at least one recess is arranged on a side of the at least one receiving element facing the contact surface.

By providing a recess, it can be provided that an area-preferably on the contact surface or between the contact surface and the at least one receiving element—is created in which chips forming through the screwing of the at least one fastening screw into the at least one receiving element can accumulate without these chips causing an unwanted lifting of the installing body of the furniture part or furniture carcass during the fastening.

Furthermore, the at least one recess can be provided so that plastic or elastically deforming (second) material of the at least one receiving element can collect, wherein again the risk of the installing body being lifted by plastic or elastically deforming (second) material off the furniture part or furniture carcass during the installation or fastening is reduced.

It is preferably provided that the at least one fastening screw has a screw head, preferably a countersunk head, which can be countersunk in the at least one receiving element in areas in the course of the fastening by deforming the at least one receiving element.

By partly or fully countersinking a screw head of the at least one fastening screw, it can be provided that the at least one fastening screw is countersunk fully in the installing body, whereby a visually tidy appearance can be created and/or space for adjacent, possibly moving components is created.

It can be provided that the at least one receiving element is mounted in movement-locking manner in at least one opening of the installing body by a press fit, preferably by plastic deformation of the at least one receiving element.

It is preferably provided that the at least one receiving element is connected to the installing body and/or is injection-molded on the installing body using a method for shaping plastic, preferably using an injection-molding method.

It can be provided that at least one receiving device is provided, wherein the furniture fitting is or can be, preferably releasably, connected to the installing body by means of the at least one receiving device.

The at least one receiving device can have a locking device with which the installing body can be connected, in particular releasably, to a fitting part of the furniture fitting.

It can be provided that the at least one receiving element is arranged in at least one opening, preferably a drilled hole, of the installing body.

It is preferably provided that the second material has a lower hardness and/or a lower strength and/or a lower modulus of elasticity and/or a higher ductility compared with the first material.

It can be provided that a fitting body and/or furniture hinge and/or fitting part which can be or is connected to the installing body has at least one clearance in an area of the at least one fastening screw and/or of the at least one receiving element, so that the at least one fastening screw mounted or mountable in the receiving element and/or the at least one receiving element is accessible for an operator.

It can be provided that the furniture fitting is formed as a furniture hinge with two fitting parts connected to one another via one, preferably precisely one, hinge pin.

Protection is further sought for a method for fastening a furniture fitting, wherein an installing body of the furniture fitting is formed of a first material, preferably a metallic material, particularly preferably a steel, at least in areas, and the installing body has at least one receiving element in which at least one fastening screw is mounted with a screw tip, wherein the at least one receiving element is formed at least predominantly of a second material, preferably plastic, that is different from the first material, wherein

- the furniture fitting is brought into contact, with a contact surface, on a furniture part or a furniture carcass and
- the at least one fastening screw is then screwed to the furniture part or furniture carcass for fastening the furniture fitting, preferably wherein at least one fastening screw is moved through an opening in the contact surface, at least in sections, in the course of the screwing.

It is preferably provided that

- the at least one fastening screw is pre-installed in an unfastened state of the furniture fitting, wherein, in an unfastened state, the at least one fastening screw is arranged at least predominantly on a side facing away from the contact surface and is retained by the at least one receiving element, and
- the furniture fitting is then brought into contact, with the contact surface, on a furniture part or a furniture carcass.

It can be provided that, during the screwing of the at least one fastening screw, the at least one receiving element is deformed, wherein escaping and/or deformed second material is collected in at least one recess on the at least one receiving element and/or the installing body.

It is preferably provided that, during the screwing of the at least one fastening screw, at least one chip forms through the screwing of the at least one fastening screw into the receiving element, wherein the at least one chip is crushed by at least one indentation on the at least one receiving element.

BRIEF DESCRIPTION OF THE DRAWINGS

Further details and advantages of the present invention arise from the following description of the figures. There are shown in.

DETAILED DESCRIPTION OF THE INVENTION

Figure 1A:
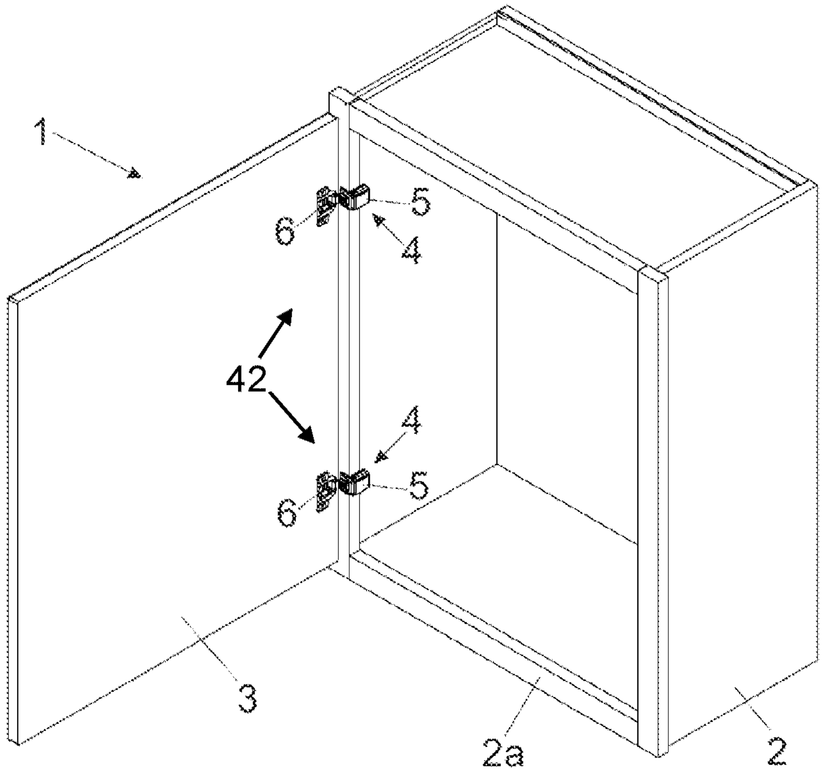
FIGS. 1*a*, 1*b* show a perspective view of a piece of furniture with a furniture carcass and a furniture part mounted movable relative to the furniture carcass, as well as a perspective view of a furniture hinge for the movable mounting of the furniture part.

FIG. 1a shows a perspective view of a piece of furniture 1 with a furniture carcass 2 and a furniture part 3, which is mounted pivotable relative to the furniture carcass 2 by two or more furniture fittings 42, more specifically furniture hinges 4.

The furniture hinges 4 have two fitting parts 5, 6 connected to one another in an articulated manner, wherein a first fitting part 5 of the furniture hinge 4 is to be fastened on the furniture carcass 2 and a second fitting part 6 of the furniture hinge 4 is to be fastened on the movable furniture part 3.

In the embodiment example shown, the furniture hinges 4 are formed as so-called frame hinges. The first fitting part 5 of the furniture hinge 4 can be designed as an angled hinge arm 5a (FIG. 1b), which is to be fastened on a frame 2a of the furniture carcass 2.

Figure 1B:
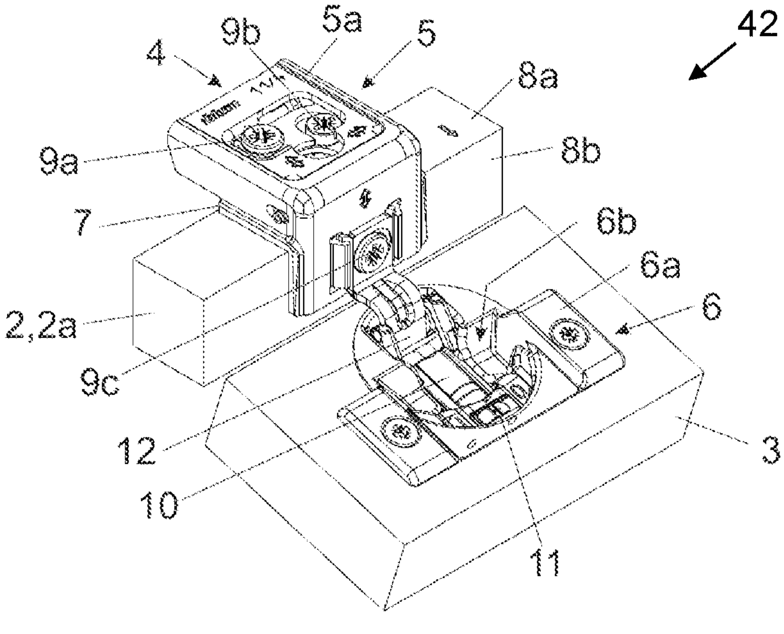

FIG. 1b shows the furniture hinge 4 in an installed state on the frame 2a of the furniture carcass 2. The first fitting part 5 in the form of the hinge arm 5a is designed substantially L-shaped, wherein a first limb of the L-shaped hinge arm 5a can be attached to a narrow side 8a of the frame 2a and a second limb of the L-shaped hinge arm 5a can be attached to a side face 8b of the frame 2a.

The first fitting part 5 in the form of the hinge arm 5a is to be fastened on the furniture carcass 2 via an installing body 7, wherein in a first installation step the installing body 7 is to be fastened on the furniture carcass 2, preferably on the frame 2a. In a subsequent installation step, the first fitting part 5 can be locked toollessly to, and can be unlocked toollessly from, the installing body 7 that is pre-installed on the furniture carcass 2.

A position of the furniture part 3 in an installed state on the furniture carcass 2 is settable by at least one or more setting devices 9a, 9b, 9c. It is preferably provided that three setting devices 9a, 9b, 9c are provided, by which a three-dimensional setting of the furniture part 3 relative to the furniture carcass 2 can be made possible. A depth setting of the movable furniture part 3 can be brought about by the first setting device 9a, a height setting can be brought about by the second setting device 9b and a lateral setting can be brought about by the third setting device 9c. At least one, preferably all, of the setting devices 9a, 9b, 9c have a rotatably mounted setting wheel (for example an eccentric, a spiral disk or a setting screw).

The second fitting part 6 of the furniture hinge 4 can be designed as a hinge cup 6a, which is pivotably connected to the first fitting part 5 via at least one hinge pin 14 (FIG. 2), preferably precisely one hinge pin 14. The hinge cup 6a has a cavity 6b, in which a damping device 10 for damping a movement of the two fitting parts 5, 6 of the furniture hinge 4 relative to one another is arranged. The damping device 10 can comprise at least one, preferably hydraulic, piston-cylinder unit, which can be loaded by a pivotable articulated lever 12 of the furniture hinge 4 in the case of a predefined position of the fitting parts 5, 6 relative to one another. A damping power of the damping device 10 can be limited or deactivated by a movably mounted switch 11 with at least two switch positions.

Figure 2:
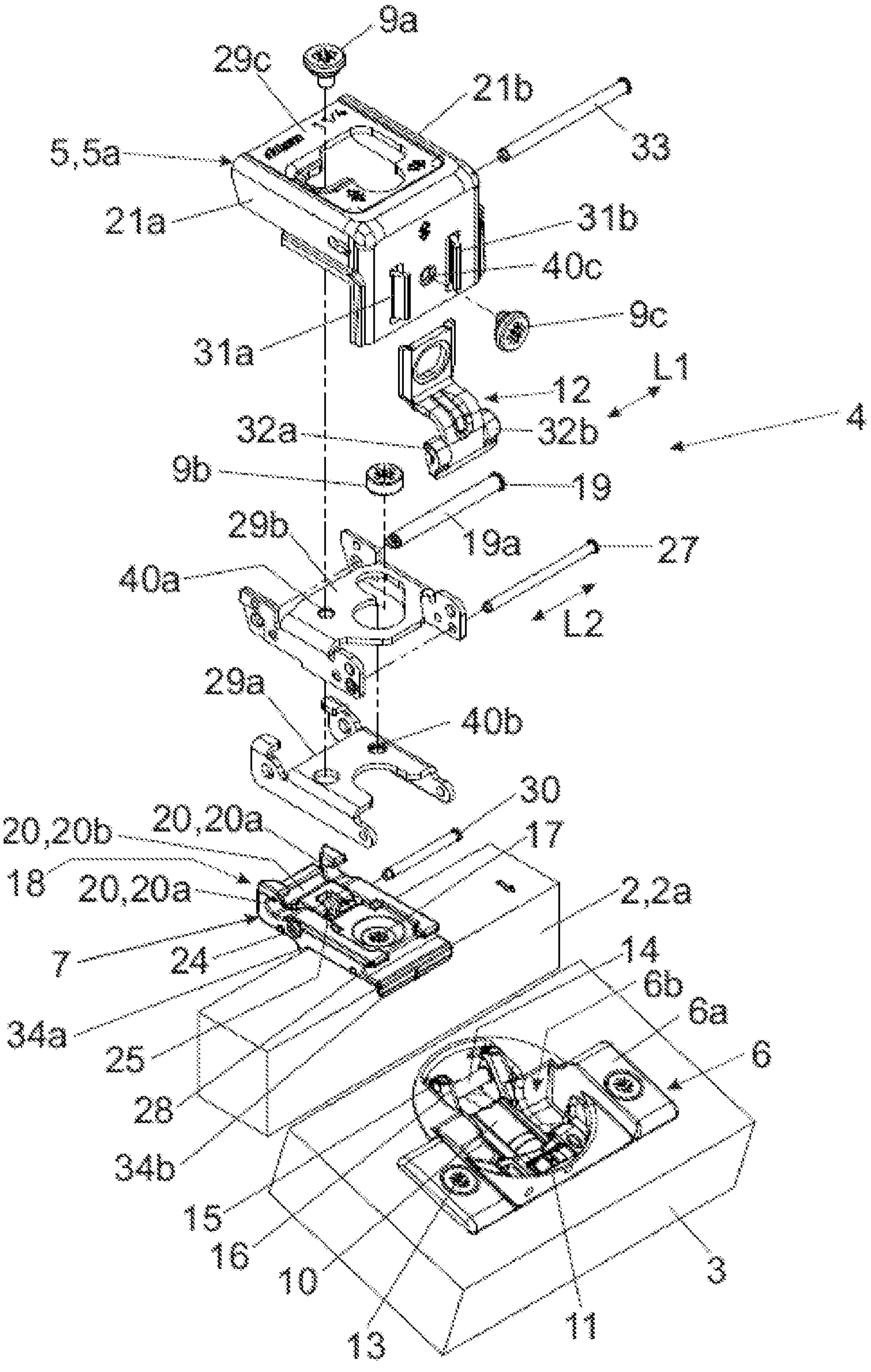
FIG. 2 shows the furniture hinge to be fastened on the installing body in an exploded representation.

FIG. 2 shows the furniture hinge 4 shown in FIG. 1b, which can be releasably locked to the installing body 7 to be fastened on the furniture carcass 2. The second fitting part 6 of the furniture hinge 4 can be designed as a hinge cup 6a. The hinge cup 6a is to be countersunk in a drilled hole of the movable furniture part 3, wherein the hinge cup 6a is to be fastened on the movable furniture part 3 by at least one fastening means 13 (for example by a screw or at least one expansion part).

The damping device 10 for damping a movement of the furniture hinge 4 is arranged in the cavity 6b of the hinge cup 6a. The second fitting part 6 is pivotably connected to the first fitting part 5 via at least one, preferably precisely one, hinge pin 14.

The furniture hinge 4 has a spring device 15, by which the second fitting part 6 is movable into a closed and/or into an open end position relative to the first fitting part 5. In the embodiment example shown, the spring device 15 is designed as a leg spring, wherein the two ends of the leg spring in each case have a plastic sheath 16. The plastic sheaths 16 in each case rest against a control curve 32a, 32b of the first fitting part 5 in an assembled state of the furniture hinge 4, whereby the friction is reduced and the fitting parts 5, 6 are movable relative to one another smoothly and practically without generating noise.

The installing body 7 is to be fastened on the furniture carcass 2, preferably on the frame 2a, via at least one fastening screw 17. The installing body 7 has at least two protrusions 34a, 34b, which can be attached to opposite sides of the frame 2a for improved pre-positioning of the installing body 7.

The installing body 7 furthermore has a receiving element 45, which receives the fastening screw 17 and is not visible in this representation for viewing reasons (reference may be made/had to FIGS. 6-9).

The first fitting part 5 can be releasably locked to the installing body 7 by a locking device 18. The locking device 18 comprises at least one retaining part 19 with a, preferably cylindrical, outer contour 19a and a locking contour 20 corresponding thereto, wherein the locking contour 20 has at least one first part 20a which is formed stationary and at least one second part 20b that is movable, preferably pivotable, relative to the first part 20a, wherein in a locked position the at least one retaining part 19 is received between the two parts 20a, 20b of the locking contour 20.

The at least one retaining part 19 can be formed in a simple manner as a cylindrical pin. The fitting part 5 to be locked can have at least two side bars 21a, 21b spaced apart from one another, between which the cylindrical pin is arranged.

The movable second part 20b of the locking contour 20 is pretensioned by a spring element 25, preferably a leg spring or leaf spring, which applies a force to the second part 20b of the locking contour 20 in the direction of the locked position. The movable second part 20b of the locking contour 20 is mounted rotatable about a bolt 30, which forms the pivot pin 24 for the movable second part 20*b* of the locking contour 20.

The two fitting parts 5, 6 of the furniture hinge 4 can be connected to one another via at least one articulated lever 12 separate from the two fitting parts 5, 6. A position of the at least one articulated lever 12 relative to the fitting part 5, 6 to be locked on the installing body 7 (in this case relative to the hinge arm 5*a*) is settable by the setting device 9*c*. For this purpose, the first fitting part 5 can have at least one linear guide 31*a*, 31*b* for the settable mounting of the articulated lever 12.

The fitting part 5 of the furniture hinge 4 to be locked on the installing body 7 can have at least two, preferably precisely three, panels 29*a*, 29*b*, 29*c* arranged one over another. The at least two panels 29*a*, 29*b*, 29*c* are displaceable relative to one another and/or pivotable relative to one another through at least one setting device 9*a*, 9*b*, 9*c*. For the linear setting of the panels 29*a*, 29*b*, 29*c* relative to one another, at least two pin-shaped retaining parts 19, 27, 33 can be provided, along which the at least two panels 29*a*, 29*b*, 29*c* are linearly displaceable relative to one another.

In the embodiment example shown, the setting devices 9*a*, 9*b*, 9*c* in each case have an eccentric. The eccentric of the first setting device 9*a* is rotatably connected (preferably by orbital riveting) to the second panel 29*b* via the mounting point 40*a* and is supported on the third panel 29*c* with its eccentric control contour.

The eccentric of the second setting device 9*b* is rotatably connected (preferably by orbital riveting) to the first panel 29*a* via the mounting point 40*b* and is supported on the second panel 29*b* with its eccentric control contour.

The eccentric of the third setting device 9*c* is rotatably connected (preferably by orbital riveting) to the first panel 29*a* via the mounting point 40*c* and is supported on the articulated lever 12 with its eccentric control contour.

Of course, it is also possible for the setting devices 9*a*, 9*b*, 9*c* also to have, instead of the eccentric, a worm gear or a rotatable spiral disk, which cooperates with protrusions of the component to be set that are spaced apart from one another.

Figure 3:
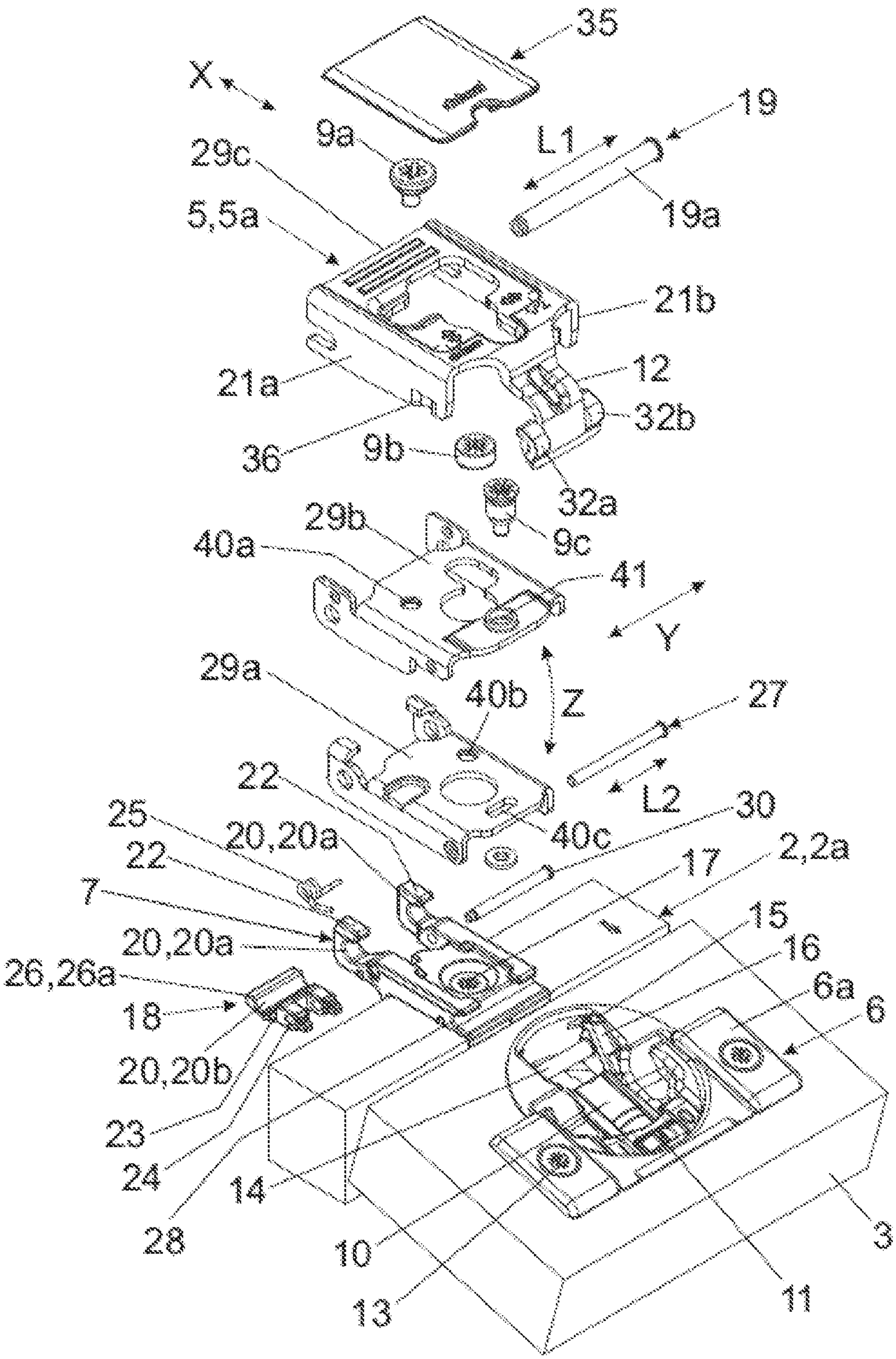
FIG. 3 shows a further embodiment example of a furniture hinge in an exploded representation.

FIG. 3 shows a slightly modified furniture hinge 4 in an exploded representation. In contrast to the furniture hinge 4 according to FIG. 2, the articulated lever 12 is integrally connected to the third panel 29*c* of the first fitting part 5. At least one setting wheel, preferably at least two setting wheels, of the setting devices 9*a*, 9*b*, 9*c* can be covered by a, preferably substantially rectangular, cover 35.

The locking device 18 can comprise at least one further retaining part 27, wherein the two retaining parts 19, 27 of the locking device 18 are spaced apart from one another in a direction transverse to the at least one hinge pin 14, wherein it is preferably provided that

- the two retaining parts 19, 27 of the locking device 18 in each case have a longitudinal direction L1, L2, wherein the longitudinal directions L1, L2 of the two retaining parts 19, 27 run substantially parallel to one another, and/or
- the at least one further retaining part 27 is formed as a cylindrical bolt, preferably wherein the fitting part 5, 6 of the furniture hinge 4 to be locked has at least two side bars 21*a*, 21*b* that are spaced apart from one another, between which the cylindrical bolt is arranged.

The at least one stationary first part 20*a* of the locking contour 20 can be formed on a hook element 22. It is preferably provided that the first part 20*a* of the locking contour 20 is open in the direction of the fitting part 6, which is connected to the fitting part 5 to be locked via the at least one hinge pin 14. It can be seen that the at least one stationary first part 20*a* of the locking contour 20 has a concave, preferably approximately semi-circular, portion in cross section.

In the embodiment example shown, the locking contour 20 has at least two stationary first parts 20*a*, which are spaced apart from one another in a direction parallel to the at least one hinge pin 14, wherein the at least one second part 20*b* of the locking contour 20 is arranged between the at least two stationary first parts 20*a* of the locking contour 20.

The at least one second part 20*b* of the locking contour 20 can be formed on a lever 23. It is preferably provided

- that at one end the lever 23 is mounted rotatable about a pivot pin 24, and/or
- that a spring element 25, preferably a leg spring or leaf spring, is provided which applies a force to the lever 23 in the direction of the locked position, and/or
- that the lever 23 has a free end 26 on which the second part 20*b* of the locking contour 20 is arranged, and/or
- that the lever 23 has a free end 26 on which an actuating element 26*a* for manually unlocking the locking device 18 is arranged.

The second panel 29*b* can be inserted from behind, i.e. in the X direction, between the side bars 21*a*, 21*b* of the third panel 29*c*, wherein the third panel 29*c* has a stop 36 pointing inwards, preferably in the form of an embossment, for limiting a movement of the second panel 29*b*. The eccentric of the first setting device 9*a* is rotatably connected to the second panel 29*b* via the mounting point 40*a* and is supported on the third panel 29*c* with its eccentric control contour. The third panel 29*c* can be set relative to the second panel 29*b* in the X direction by actuating the first setting device 9*a*.

The eccentric of the second setting device 9*b* is rotatably connected to the first panel 29*a* via the mounting point 40*b* and is supported on the second panel 29*b* with its eccentric control contour. The panels 29*b*, 29*c* can together be set relative to the first panel 29*a* in the Y direction by actuating the second setting device 9*b*.

In the embodiment example shown, the third setting device 9*c* has a setting screw, which is supported with its lower end on the mounting point 40*c* of the first panel 29*a*. The setting screw of the third setting device 9*c* is provided with an external thread, which cooperates with an internal thread 41 of the second panel 29*b*. The second panel 29*b* is pivotable relative to the first panel 29*a* about the pin-shaped retaining part 19 in the Z direction by actuating the third setting device 9*c*.

The two stationary first parts 20*a* of the locking contour 20 are in each case formed on a hook element 22, wherein the movable second part 20*b* of the locking contour 20 is arranged between the two first parts 20*a* of the locking contour 20. The movable second part 20*b* is mounted pivotable about the bolt 30, which forms the pivot pin 24 for the second part 20*b*. It is preferably provided that the direction of the at least one hinge pin 14 and the direction of the pivot pin 24 run parallel to one another.

It should be noted that in an assembled and in an installed state of the furniture hinge 4 on the furniture carcass 2 the fastening screw 17, by which the installing body 7 is fastened on the furniture carcass 2, is always to be actuated using a tool, preferably a screwdriver. For this, the recesses in the panels 29*a*, 29*b*, 29*c* are to be arranged such that an insertion of the tool and a rotational movement of the fastening screw 17 by means of the tool are possible in all operating positions of the furniture hinge 4.

FIGS. 4*a*-4*d* show the process for installing the first fitting part 5 of the furniture hinge 4 on the installing body 7. The installing body 7 is to be fastened on the furniture carcass 2, in particular on the frame 2*a* of the furniture carcass 2, via the fastening screw 17 in a first installation step. An improved pre-positioning of the installing body 7 relative to the frame 2*a* of the furniture carcass 2 is made possible by the protrusions 34*a*, 34*b*.

For reasons of clarity, in FIGS. 4*a*-4*d* the fastening screw 17 is in the first instance represented directly (without receiving element 45) in the installing body 7. Regarding the detailed fastening of the installing body 7, reference may be made to FIGS. 6-11.

The first fitting part 5 comprises the two retaining parts 19, 27, which are spaced apart from one another and have a cylindrical outer contour in the embodiment example shown. The two retaining parts 19, 27 are spaced apart from one another in a direction transverse to the at least one hinge pin 14 and in each case have a longitudinal direction L1, L2, which longitudinal directions run substantially parallel to one another.

The installing body 7 is provided with the locking contour 20, which has the two stationary first parts 20*a* and the movable second part 20*b*. The second part 20*b* is mounted movable between the two stationary parts 20*a*. The locking contour 20 of the installing body 7 can be releasably locked to the retaining part 19 of the fitting part 5. The installing body 7 additionally has a receiving device 28 for receiving the further retaining part 27 of the first fitting part 5.

Figure 4A:
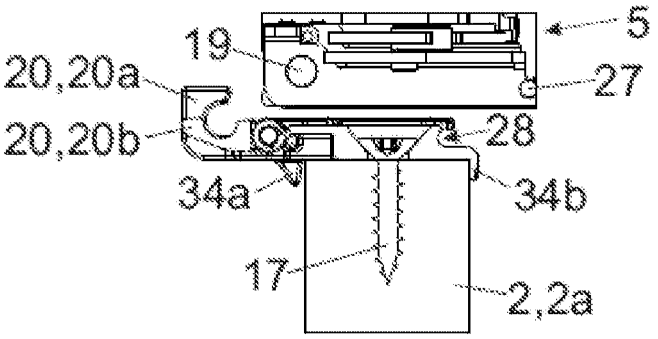
FIGS. 4*a*-4*d* show cross-section views of the process for installing the first fitting part on the installing body.
Figure 4B:
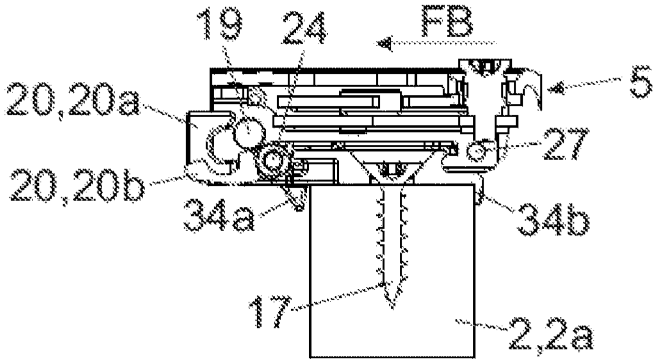

Starting from the position according to FIG. 4*a*, the fitting part 5 is placed on the installing body 7 and moved in the direction of the joining movement FB. Through the movement of the fitting part 5 in the direction of the joining movement FB, the second part 20*b* of the locking contour 20 is moved about the pivot pin 24 against a force of the spring element 25 (FIG. 4*b*).

Figure 4C:
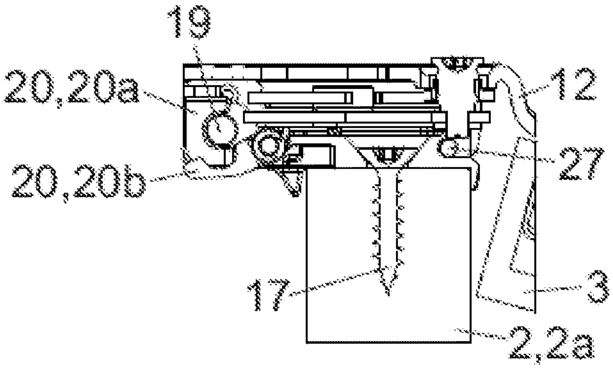
Figure 4D:
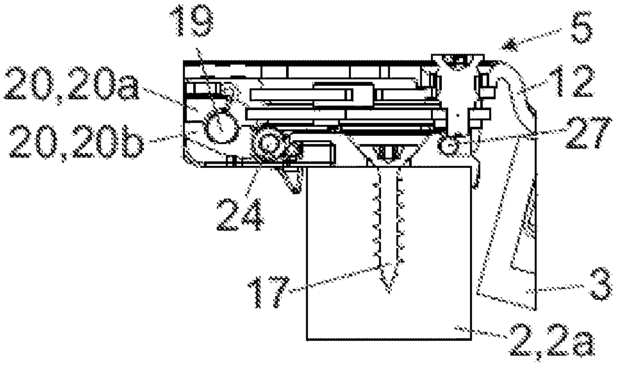

The two retaining parts 19, 27 can be arranged in the locking contour 20 and in the at least one receiving device 28 through a single common, preferably translational, joining movement FB (FIG. 4*c*). Through a continued movement of the fitting part 5 in the direction of the joining movement FB, the second part 20*b* of the locking contour 20 snaps back due to a force of the spring element 25 and thereby locks the retaining part 19 in a friction-locking and in a positive-locking manner. The two parts 20*a*, 20*b* of the locking contour 20 together form a three-quarter circle in cross section and/or are arranged offset relative to one another in a direction parallel to the at least one hinge pin 14.

The locking between the installing body 7 and the fitting part 5 is releasable again through the exertion of force on the second part 20*b* of the locking contour 20 against a force of the spring element 25. The exertion of force on the second part 20*b* for releasing the locking can be effected for example manually, i.e. without the use of a tool. Alternatively, a tool can also be used for the exertion of force on the second part 20*b* for releasing the locking between the installing body 7 and the fitting part 5.

Figure 5A:
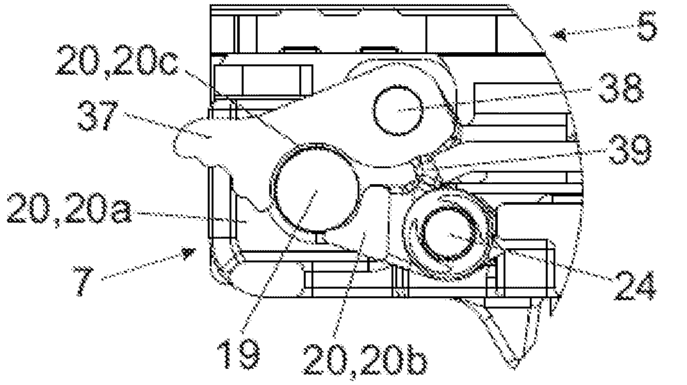
FIGS. 5a-5c show a embodiment with an additional further unlocking lever for releasing the locking between the installing body and the retaining part.
Figure 5B:
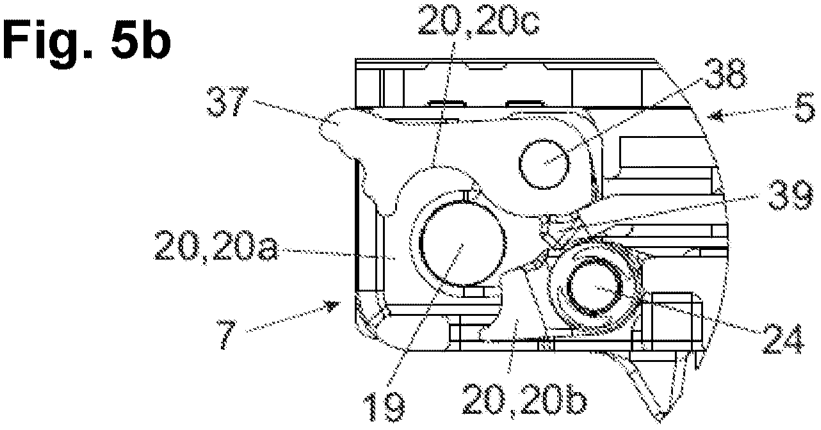
Figure 5C:
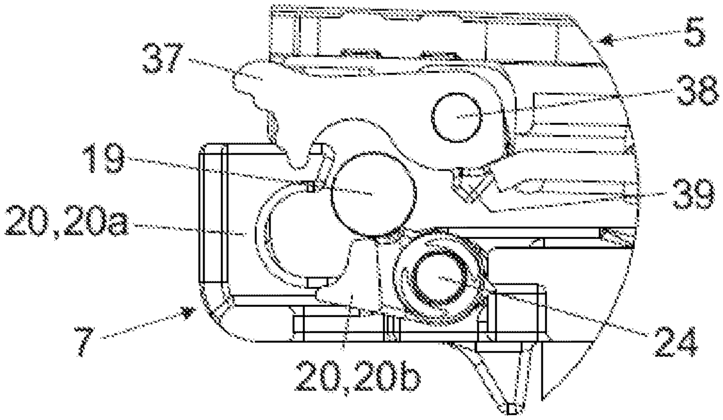

FIGS. 5*a*-5*c* show the locked state between the installing body 7 and the fitting part 5, wherein the locking device 18 has an additional unlocking lever 37 for releasing the locking between the installing body 7 and the fitting part 5 of the furniture hinge 4.

For reasons of clarity, in FIGS. 5*a*-5*c* the fastening screw 17 is in the first instance represented directly (without receiving element 45) in the installing body 7. Regarding the detailed fastening of the installing body 7, reference may be made to FIGS. 6-11.

In the embodiment example shown, the locking device 18 comprises a third locking contour 20*c* which is arranged on the unlocking lever 37 and adapted to an outer contour 19*a* of the retaining part 19 at least in sections. In the embodiment example shown, the third locking contour 20*c* is formed substantially semi-circular.

The unlocking lever 37 is formed as a component separate from the second part 20*b* of the locking contour 20, wherein the unlocking lever 37 is immediately and directly accessible for a manual actuation or for an actuation being effected by means of a tool.

The unlocking lever 37 is pivotable about the pivot pin 38 by a manual lifting movement, whereby the third part 20*c* of the locking contour 20 can be brought out of engagement with the retaining part 19 (FIG. 5*b*).

The unlocking lever 37 is coupled via at least one coupling device 39 to the second part 20*b* of the locking contour 20 such that the at least one unlocking lever 37 and the second part 20*b* of the locking contour 20 are pivotable in opposite directions of rotation.

In the embodiment example shown, the coupling device 39 is formed by a protrusion, arranged on the unlocking lever 37, which, in a locked position between the installing body 7 and the fitting part 5, rests loosely against the second part 20*b* of the locking contour 20 (FIG. 5*a*). Upon a movement of the unlocking lever 37 about the pivot pin 38, the protrusion of the coupling device 39 presses against the second part 20*b* of the locking contour 20, with the result that the second part 20*b* is pivoted about the pivot pin 24 in an opposite direction of rotation and thus releases the retaining part 19.

FIG. 5*c* shows the unlocked state between the installing body 7 and the fitting part 5. In the embodiment example shown, the unlocking lever 37 is arranged movable on the fitting part 5, wherein it is preferably provided that the pivot pin 38 of the unlocking lever 37 and the at least one hinge pin 14 of the furniture hinge 4 run parallel to one another.

Figure 6:
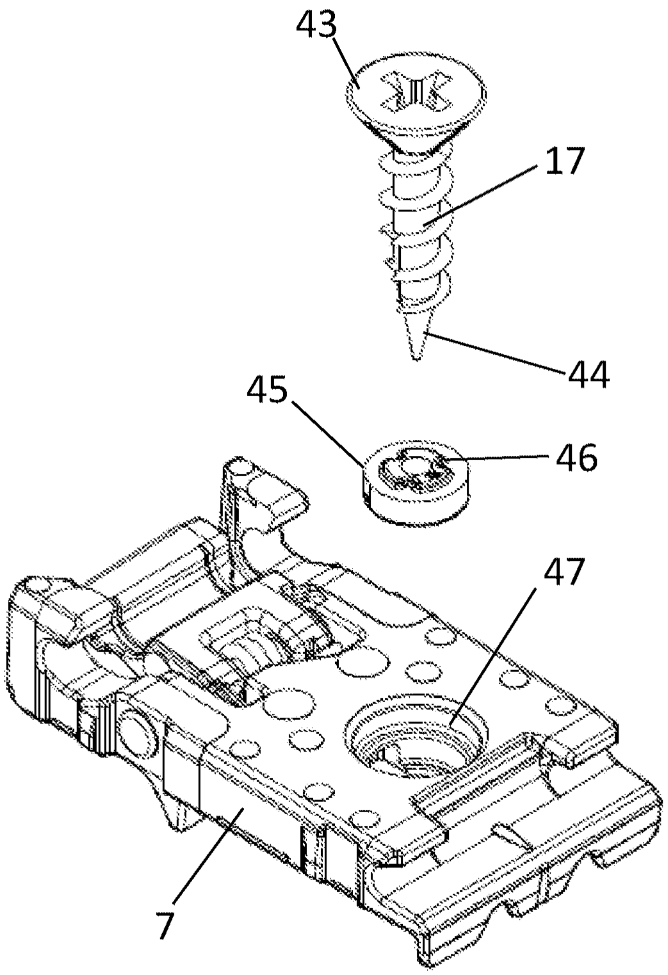
FIG. 6 shows the installing body for fastening a furniture fitting in an exploded representation.

FIG. 6 shows the installing body 7 for fastening a furniture fitting 42 in an exploded representation.

The installing body 7 is connected via a receiving element 45, which is arranged in an opening 47 of the installing body 7, to the furniture part 3 or furniture carcass 2 via a fastening screw 17.

In this embodiment example, the fastening screw 17 shown has a tip 44 and a countersunk head 43.

Figure 7A:
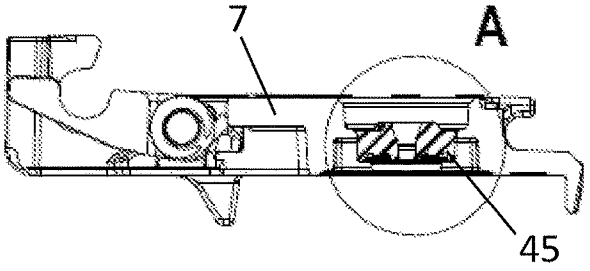
FIGS. 7a, 7b show the installing a sectional body in representation.
Figure 7B:
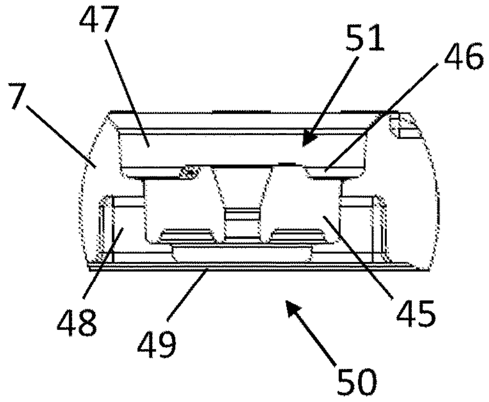

FIG. 7 shows the installing body 7 in a side representation, wherein the detail view A indicated in FIG. 7*a* is shown in FIG. 7*b*.

In this embodiment variant, the receiving element 45 is now connected in movement-locking manner in the installing body 7 via a press fit. Alternatively, it could also be provided that the receiving element 45 is molded by injection molding into the opening 47 of the installing body 7.

Here, the receiving element 45 of this embodiment example is produced from a rubber material, whereas the installing body 7 is made using a steel.

The receiving element 45 is arranged in the opening 47, which is formed as a drilled hole, of the installing body 7.

The installing body 7 has a contact surface 49 with which contact surface 49 the installing body 7 can be attached to a furniture part 3 or furniture carcass 2 for fastening or installation.

The receiving element 45 is furthermore formed, on a side 51 facing away from the contact surface 49, with radial indentations 46 (see also FIG. 6) which are formed to crush a chip formed through the screwing of a fastening screw 17 into the receiving element 45. Resultant flow chips can thereby be converted (or crushed) by the indentations into discontinuous chips which can be removed or can remain in an upper area of the opening 47, without influencing the fastening of the installing body 7.

Further, the opening 47—more specifically the installing body 7—has, on a side 50 facing the contact surface 49, a recess 48, which is formed to receive material of the receiving element 45 that has escaped and/or deformed during the screwing-in of the fastening screw 17 (cf. also FIG. 9*b* on this), with the result that this escaping material does not lift the installing body 7 off a furniture part 3 or furniture carcass 2 at the contact surface 49.

Figure 8A:
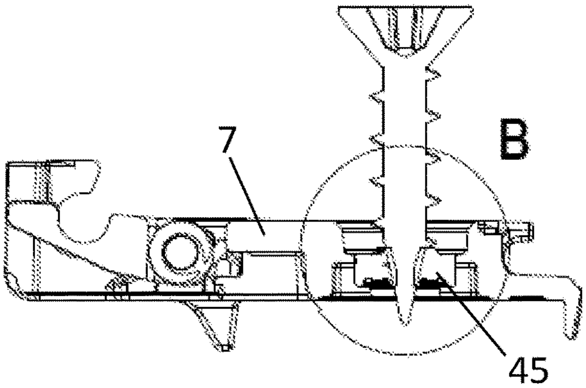
FIGS. 8a, 8b show the installing body with a fastening screw in a sectional representation in a pre-installed state.

FIG. 8*a* shows the installing body 7 with a fastening screw 17 in a sectional representation in a pre-installed state, wherein the fastening screw 17 is screwed into the receiving element 45 with the tip 44 and is retained there by the receiving element 45 already in the area of the tip 44 of the fastening screw 17.

This results in the advantage that it is necessary to drive the fastening screw 17 further into the installing body 7 until the largest diameter of the fastening screw 17 engages, wherein the tip 44 of the fastening screw 17 would already protrude further at the contact surface 49 of the installing body 7 and would possibly hinder an attachment of the installing body 7 to a furniture carcass 2 or a furniture part 3.

Figure 8B:
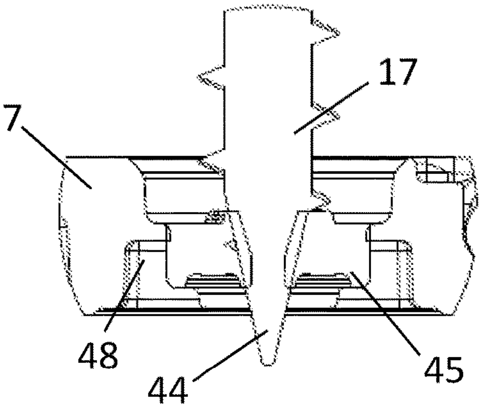

The detail view B represented in FIG. 8*a* is in turn shown in FIG. 8*b*.

In this pre-installed state of the installing body 7 with the fastening screw 17, the installing body 7 can now be attached to a furniture part 3 or a furniture carcass 2 at the contact surface 49.

Once the installing body 7 has now been attached at the contact surface 49, the fastening of the installing body 7 to the furniture carcass 2 or furniture part 3 can be undertaken by screwing the fastening screw 17 through the opening 47 of the installing body 7 into the furniture carcass 2 or furniture part 3 until the countersunk head 43 fastening screw 17 reaches the receiving element 45.

Figure 9A:
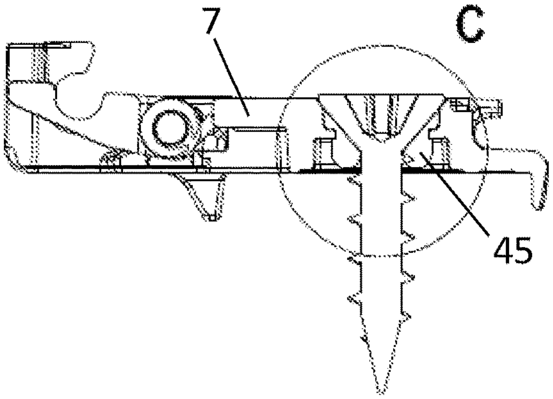
FIGS. 9a, 9b show the installing body in a sectional representation in an installed state.

FIG. 9*a* shows the installing body in a sectional representation in an installed state. The detail view C represented in FIG. 9*a* is in turn shown in FIG. 9*b*.

The countersunk head 43 of the fastening screw 17 can now be countersunk into the receiving element 45, whereby the receiving element 45 is deformed.

The displaced material of the receiving element 45 is now accommodated in the recess 48 of the opening 47 of the installing body 7, whereby it is ensured that this displaced material does not lift the installing body 7 off the furniture part 3 or furniture carcass 2 at the contact surface 49.

Figure 9B:
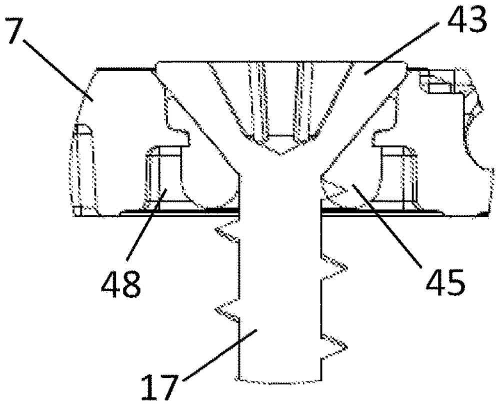
Figure 10A:
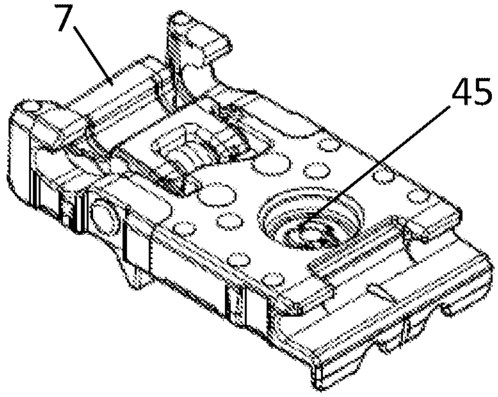
FIGS. 10a-10c show a perspective view of the embodiments represented in FIGS. 7-9 and FIGS. 11a, 11b show a perspective view of the furniture fitting with a fastening screw in a pre-installed state.
Figure 10B:
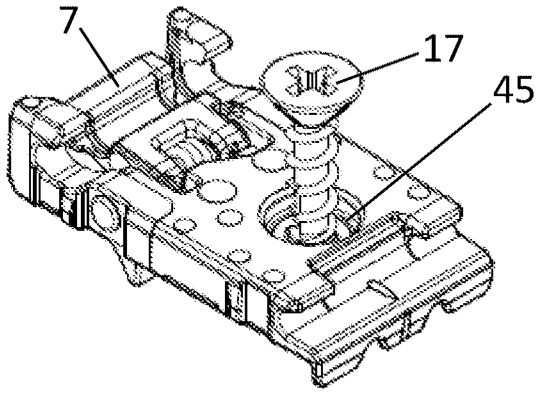
Figure 10C:
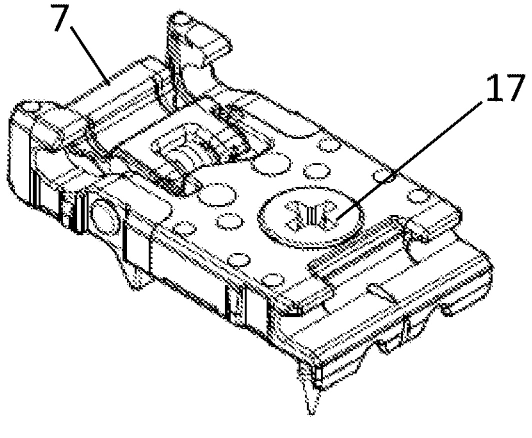

FIGS. 10*a* to 10*c* show a perspective view of the embodiments represented in FIGS. 7 to 9, wherein FIG. 10*a* shows a perspective view of the embodiment of FIGS. 7*a* and 7*b*, FIG. 10*b* a perspective view of the embodiment of FIGS. 8*a* and 8*b* and FIG. 10*c* a perspective view of the embodiment of FIGS. 9*a* and 9*b*.

Figure 11A:
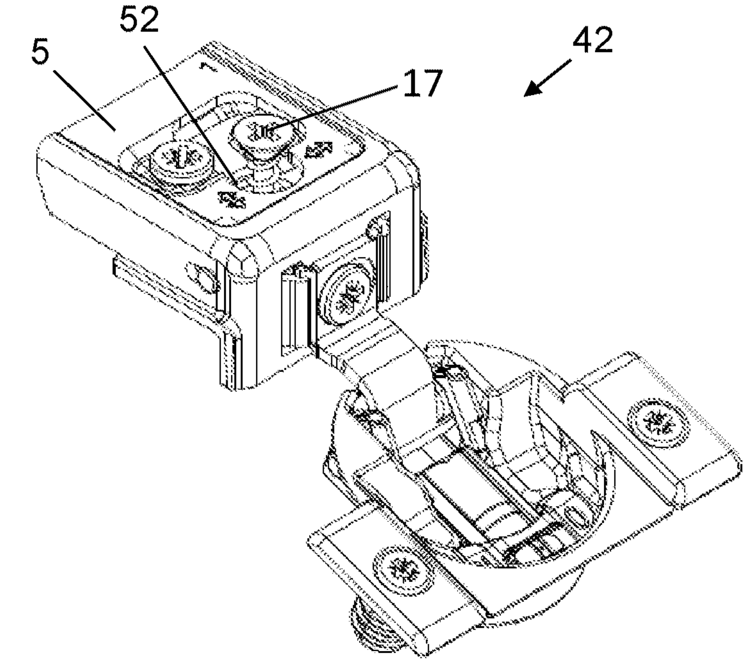
Figure 11B:
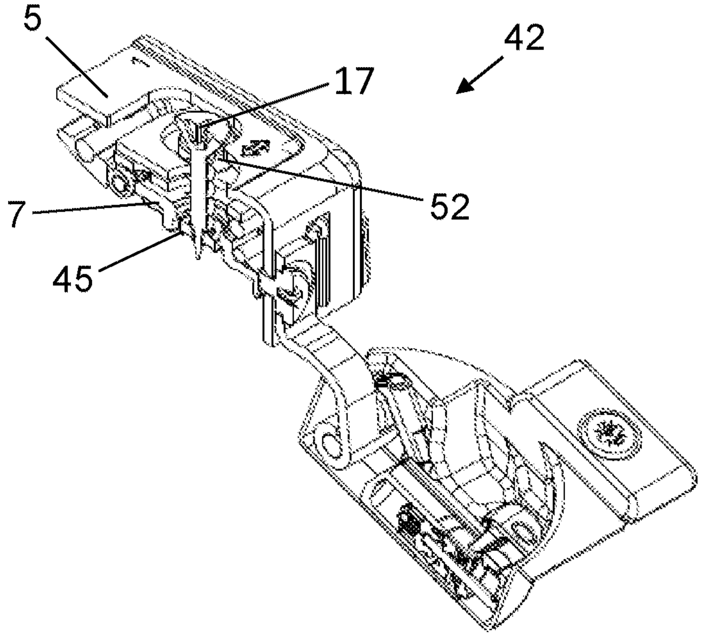

FIGS. 11*a* and 11*b* show a perspective view of the furniture fitting 42 with a fastening screw 17 in a pre-installed state.

FIG. 11*b* shows a section of FIG. 11*a* along a longitudinal axis.

Here it can be seen how the fastening screw 17 has been pre-installed by screwing the tip 44 into the receiving element 45. The receiving element 45 is in turn mounted in movement-locking manner in the installing body 7 by a press fit.

In this embodiment example, the fitting part 5 is connected to the installing body 7.

The fitting part 5 has a clearance 52, through which the fastening screw 17, accessible from the outside, can be screwed in or also released by an operator.

This clearance 52 is provided in an area of the fitting part 5 in which the fastening screw 17 is to be arranged for fastening the furniture fitting 42 via the installation of the fitting part 5 on the installing body 7.

LIST OF REFERENCE NUMBERS

1 piece of furniture
2 furniture carcass
2*a* frame
3 furniture part
4 furniture hinge
5 fitting part
5*a* hinge arm
6 fitting part
6*a* hinge cup
6*b* cavity
7 installing body
8*a* side face
9*a, b, c* setting devices
10 damping device
11 switch
12 articulated lever
13 fastening means
14 hinge pin
15 spring device
16 plastic sheath
17 fastening screw
18 locking device
19 retaining part
20 locking contour
20*a* first part
20*b* second part
21*a, b* side bar
22 hook element
23 lever
24 pivot pin
25 spring element
26 end
26*a* actuating element
27 retaining parts
28 receiving device
29*a, b, c* panels
30 bolt
31*a, b* linear guide
32*a, b* control curve
33 retaining parts
34*a, b* protrusion
35 cover
36 stop
37 unlocking lever
38 pivot pin
39 coupling device
40*a, b, c* mounting point
41 internal thread
42 furniture fitting
43 countersunk head
44 tip of the fastening screw
45 receiving element
46 indentation
47 opening
48 recess

49 contact surface
50 side facing
51 side facing away
52 clearance

The invention claimed is:

1. A furniture fitting for movably mounting a furniture part on a furniture carcass, comprising:

an installing body having at least one receiving element;

a fitting body or fitting part which is connected to the installing body; and at least one fastening screw, wherein the installing body is configured to be fastened on the furniture part or furniture carcass with the at least one fastening screw mounted in the at least one receiving element, the at least one receiving element being arranged along an axis of symmetry of the installing body, wherein the installing body is at least partially formed of a first material, and the at least one receiving element is formed at least predominantly of a second material that is different from the first material, wherein the fitting body or fitting part which is connected to the installing body has at least one clearance in the form of an opening in an area of the at least one fastening screw and the at least one receiving element so that the at least one fastening screw mounted in the at least one receiving element is accessible for an operator, and wherein the opening is arranged along an axis of symmetry of the fitting body or fitting part.

2. The furniture fitting according to claim 1, wherein the installing body has at least one contact surface which is configured to be attached to the furniture part or furniture carcass, and wherein in an unfastened state of the installing body, the at least one fastening screw is arranged at least predominantly on a side of the installing body which faces away from the at least one contact surface, and is movable at least in sections through an opening in the at least one contact surface during fastening of the installing body.

3. The furniture fitting according to claim 1, wherein the at least one receiving element has at least one, substantially radial, indentation.

4. The furniture fitting according to claim 1, wherein the installing body has at least one recess.

5. The furniture fitting according to claim 1, wherein the at least one fastening screw has a screw head which is configured to be at least partially countersunk in the at least one receiving element by deforming the at least one receiving element during fastening of the installing body.

6. The furniture fitting according to claim 1, wherein the at least one receiving element is mounted in a movement-locking manner in at least one opening of the installing body by a press fit.

7. The furniture fitting according to claim 1, wherein the at least one receiving element is connected to the installing body or is injection-molded onto the installing body using a method for shaping plastic.

8. The furniture fitting according to claim 1, wherein the installing body includes at least one receiving device, wherein the fitting body or fitting part is connected to the installing body by the at least one receiving device.

9. The furniture fitting according to claim 8, wherein the at least one receiving device has a locking device with which the installing body can be locked to the fitting body or fitting part.

10. The furniture fitting according to claim 1, wherein the at least one receiving element is arranged in at least one opening of the installing body.

11. The furniture fitting according to claim 1, wherein the second material has a lower hardness than the first material, or a lower strength than the first material, or a lower modulus of elasticity than the first material, or a higher ductility than the first material.

12. A piece of furniture with the furniture fitting according to claim 1.

13. A method for fastening the furniture fitting according to claim 1, the method comprising:

bringing a contact surface of the furniture fitting into contact with a furniture part or a furniture carcass; and screwing the at least one fastening screw into the furniture part or furniture carcass so as to fasten the furniture fitting.

14. The method according to claim 13, further comprising before the bringing of the contact surface of the furniture fitting into contact with the furniture part or the furniture carcass, pre-installing the at least one fastening screw in an unfastened state of the furniture fitting, wherein in the unfastened state, the at least one fastening screw is arranged at least predominantly on a side facing away from the contact surface and is retained by the at least one receiving element.

15. The method according to claim 13, wherein, during the screwing of the at least one fastening screw, the at least one receiving element is deformed, and wherein escaping or deformed second material is collected in at least one recess on the at least one receiving element or the installing body.

16. The method according to claim 13, wherein during the screwing of the at least one fastening screw, at least one chip forms through the screwing of the at least one fastening screw into the receiving element, wherein the at least one chip is crushed by at least one indentation on the at least one receiving element.

17. A furniture fitting for movably mounting a furniture part on a furniture carcass, comprising:

an installing body having at least one receiving element; and at least one fastening screw, wherein the installing body is configured to be fastened on the furniture part or furniture carcass with the at least one fastening screw mounted in the at least one receiving element, wherein the installing body is at least partially formed of a first material, and the at least one receiving element is formed at least predominantly of a second material that is different from the first material, wherein the installing body has at least one contact surface which is configured to be attached to the furniture part or furniture carcass, and wherein the at least one receiving element is arranged on the installing body so as to be spaced apart from a plane spanned by the at least one contact surface in an unfastened state of the installing body by virtue of the installing body, and in a fastening state of the installing body in which the at least one contact surface is in contact with the furniture part or furniture carcass for fastening the at least one fastening screw.

18. The furniture fitting according to claim 17, wherein the at least one receiving element has at least one, substantially radial, indentation arranged on a side of the at least one receiving element which faces away from the at least one contact surface.

19. The furniture fitting according to claim 17, wherein the installing body has at least one recess arranged on a side of the installing body which faces the contact surface.

20. A method for fastening the furniture fitting according to claim 17, the method comprising:

bringing the at least one contact surface of the furniture fitting into contact with a furniture part or a furniture carcass; and screwing the at least one fastening screw into the furniture part or furniture carcass so as to fasten the furniture fitting.

21. A furniture fitting for movably mounting a furniture part on a furniture carcass, comprising:

an installing body having at least one receiving element, wherein the installing body is configured to lie flat on the furniture part or furniture carcass in a vicinity of the at least one receiving element; and at least one fastening screw, wherein the installing body is configured to be fastened on the furniture part or furniture carcass with the at least one fastening screw mounted in the at least one receiving element, wherein the installing body is at least partially formed of a first material, and the at least one receiving element is formed at least predominantly of a second material that is different from the first material, wherein the furniture fitting is formed as a furniture hinge with a first fitting part and a second fitting part connected to one another via a hinge pin, wherein the first fitting part comprises the installing body and the second fitting part comprises a hinge cup, and wherein the installing body is configured to be mounted to the furniture part or furniture carcass by virtue of the at least one screw in a dowel-free manner, wherein the installing body has at least one contact surface which is configured to be attached to the furniture part or furniture carcass, and wherein the at least one receiving element is arranged on the installing body exclusively on one side relative to a plane spanned by the at least one contact surface.

22. A method for fastening the furniture fitting according to claim 21, the method comprising:

bringing a contact surface of the furniture fitting into contact with a furniture part or a furniture carcass; and screwing the at least one fastening screw into the furniture part or furniture carcass so as to fasten the furniture fitting.

* * * * *